CHARLES H. PARSHALL.
Improvement in Lubricators.
No. 128,167.                               Patented June 18, 1872.
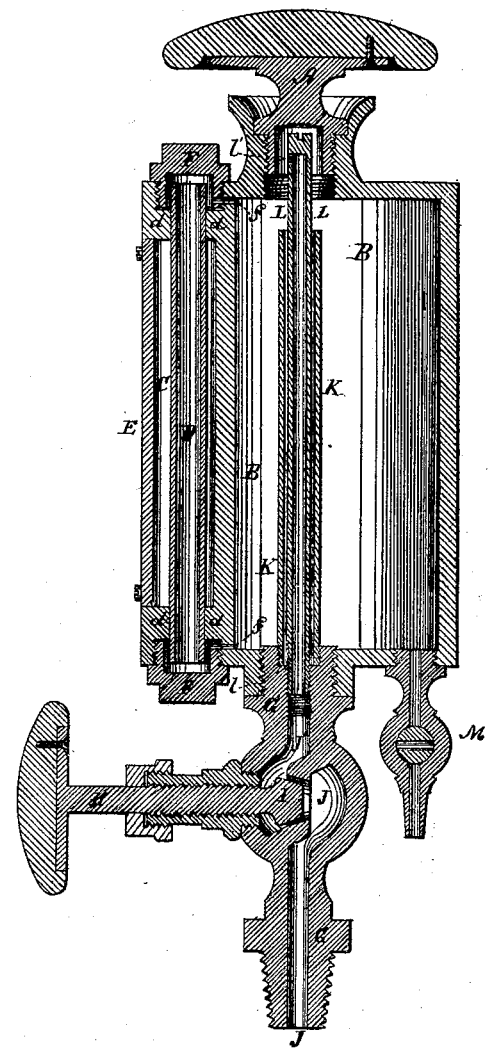
WITNESSES:                                 INVENTOR:

UNITED STATES PATENT OFFICE.

CHARLES H. PARSHALL, OF DETROIT, MICHIGAN.

IMPROVEMENT IN LUBRICATORS.

Specification forming part of Letters Patent No. 128,167, dated June 18, 1872.

*To all whom it may concern:*

Be it known that I, CHARLES H. PARSHALL, of Detroit, county of Wayne, State of Michigan, have invented a new and Improved Oil-Cup to be used in lubricating machinery; and I declare the following to be a full, clear, and exact description of the same, such as will enable others skilled in the art to which it pertains to make and use it, reference being had to the accompanying drawing which forms a part of this specification.

My invention relates to oil-cups commonly used on locomotives and other machinery for lubricating certain parts of the machinery.

In the drawing is presented a view of oil-cup complete, in section by a vertical plane, containing the axis of the valve-rod, in which—

A is screw-cap, made hollow on the under side. B is the lubricant-chamber. C is hot-air chamber, containing glass tube D, and inclosed by glass face E. F F are screw-caps, with communications $ff$ with chamber B. G is a valve-stem holding the valve-rod H, provided with a screw-stem and conical valve-head, I. J is the steam-duct, communicating, through the valve, with its continuation J'. K is a tube screwed into valve-stem G at bottom, and having no opening except at the top. L is a smaller concentric tube, also screwed into valve-stem G at bottom. A small elongated hole, $l$, is made through this tube at the bottom, which can be made smaller, or be stopped altogether, by screwing the tube further down into the stem G. The top of the tube is formed like the head of a screw, so as to facilitate screwing down the tube. A lateral hole, $l'$, is formed for the purpose of creating an equilibrium between B and the inside of tube L. M is a common faucet.

The top A being removed, the lubricant is inserted into B and the top replaced. The valve I is then run out slightly, and the steam passes up through J J' and L, and exerts a pressure upon, and, by heating, liquefies the lubricant in B. As soon as the pressure is so great as to make the inclosed steam more dense than the oil the latter will rise and flow down through the tube K into the hole $l$ at the bottom of the tube L, into the duct J' through the valve into J, and thence to the machinery. The hole $l'$ at the top of L serves to preserve an equilibrium between the tube L and chamber B. As soon as the steam begins to flow into B condensation begins, and the water settles to the bottom and drives the oil up over the top of the tube K. The height of water being shown in the indicator D, the amount of oil remaining can be seen. When it is desired to refill the chamber B the valve I is closed, the faucet M opened to draw off the water; it is then filled as at first. If it be desired to feed the water back into the machinery with the oil, simply remove the outer tube K, and the oil and water will be fed simultaneously through the hole $l$.

A hot-air chamber, C, is provided, inclosing the glass tube D. This tube is packed around its sides at the top and bottom at $d\ d$, and terminates at both ends in hollow screws F, from which are openings or ducts $ff$, into the chamber B. A glass face, E, is placed over the face of the chamber C.

I know that a glass tube similarly inclosed in a hot-air chamber, C, is not new, being incorporated in and claimed by me in a recent patent; but the packing at $d\ d$ in this connection is new.

Having thus described my invention, what I claim as new, and desire to secure by Letters Patent, is—

1. In an oil-cup, the combination of the concentric tubes K and L, the latter being provided with the opening $l'$ and gaugable opening $l$, constructed and operating in the manner substantially as set forth and shown.

2. In combination with an oil-cup, the hot-air chamber C, when inclosing the tube D, packed at $d\ d$, and provided with ducts $ff$, constructed in the manner and for the purposes substantially as shown and described.

3. The combination of the cup B provided with faucet M, and stem G provided with ducts J' J, screw-valve I, tube L, and with or without the concentric tube K, all constructed, arranged, and operating co-operatively, in the manner substantially as set forth and shown.

CHARLES H. PARSHALL.

Witnesses:
EDWARD Y. SWIFT,
DONALD BREMNER.